July 22, 1952  M. S. TYSON  2,604,507
SHIELDING CLOSURE MEANS
Filed Aug. 9, 1945
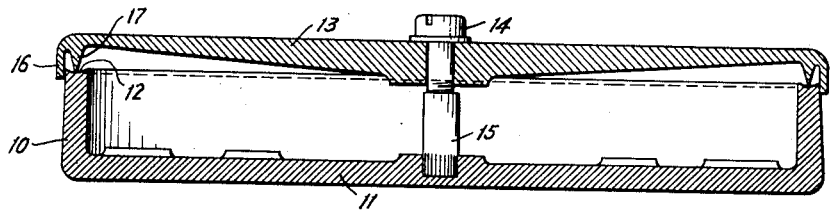
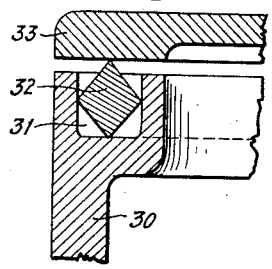 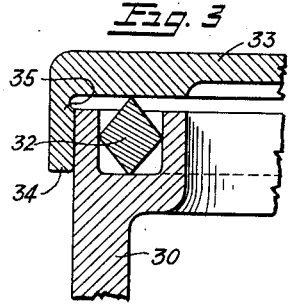 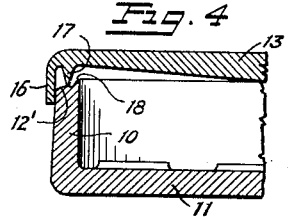
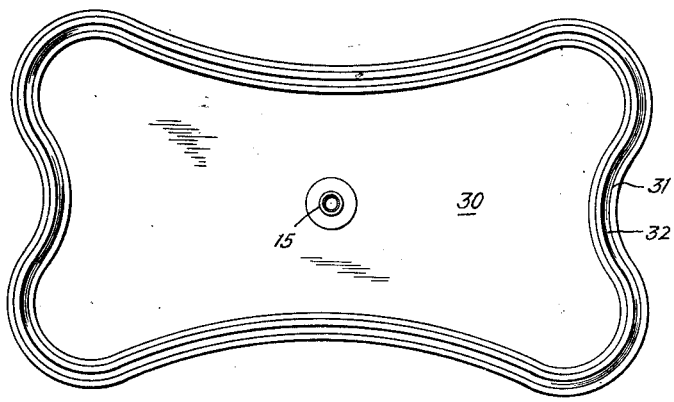
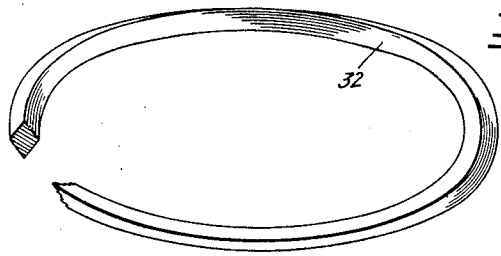
INVENTOR.
Miller S. Tyson
BY
Dale A. Bauer
ATTORNEY.

Patented July 22, 1952

2,604,507

UNITED STATES PATENT OFFICE 2,604,507

SHIELDING CLOSURE MEANS

Miller S. Tyson, Larchmont, N. Y., assignor to Bendix Aviation Corporation, New York, N. Y., a corporation of Delaware Application August 9, 1945, Serial No. 609,886

1 Claim. (Cl. 174—35)

This invention relates to radio shielding of electrical instrumentalities that are capable of emitting radio waves.

Because of the characteristics of the ignition circuit used in connection with internal combustion engines, of which aircraft engines are one example, the ignition impulse consists of repeated transients which for purposes of description can be considered to be composed of a fundamental and a series of high frequency components extending into the radio frequency spectrum band. These high frequency components give rise to electromagnetic fields which affect the aircraft radio receiver and result in undesirable interference noises. Radio interference is very similar in nature to the emissions of radio apparatus, being generated, transmitted, radiated and intercepted by the same mechanism that is utilized in the production of intelligence signals. Therefore the emissions, for instance of aircraft magnetos, are broadcast by the ignition system wiring acting as antennae and are picked up by the aerial of the aircraft radio receiving set, producing interference which is destructive to the reception of intelligence signals.

It may be thought to be a simple matter to shield the radio from the emanations of the ignition system, but such shielding also excludes intelligence signals; therefore, it may be considered to be necessary to apply the shielding to the ignition system. This, because of the complexity and structure of such systems, is a complex undertaking the difficulty of which is increased because the full nature of the electrical problem and the principles of shielding have not heretofore been fully known.

In order briefly to illustrate some of the difficulties which arise it is explained that interfering emanations may reach the radio through a number of transmission channels; for instance, directly through any poor junction in the shielding, or through any connection that will permit a portion of a current or an induced current to flow on the outside surface of the shielding where it can result in establishing radio frequency radiation, being thence transferred by capacity coupling, by inductive coupling, by electromagnetic radiation, or by conductive coupling to physically separate circuits such as the radio circuit.

In the past it has been proposed to provide shielding for the prevention of radio interference by enclosing all parts of the ignition circuit in metal housings or shields, but it has been discovered in practice that even designs which seemed to provide complete enclosure were in fact defective and interference still occurred. Attempts have been made to overcome these apparent imperfections by the use of thick metal parts and by the use of particular types of metal. However, it is the observation of this inventor that such conceptions, while possessing a certain utility have not exposed the heart of the difficulty.

It is an object of this invention to improve radio shielding by improving the shielding effect of the joints in the shielding harness. The invention springs from the verified belief that interfering emissions escape from the ignition system at joints that appear to be completely shielded. The conception of this invention includes in one of its phases a new type of joint having superior shielding characteristics, and the correctness of the conceptions has been demonstrated by practical tests on apparatus constructed in accordance with the principles of this invention.

The above and further objects of this invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claim.

In the drawings:

Fig. 1 is a vertical section through a casing designed to house and shield electrical instrumentalities capable of emitting radio waves;

Fig. 2 is a vertical section through a modified form of the invention;

Fig. 3 is a vertical section through still another modified form of the invention;

Fig. 4 is a vertical section through yet another modified form of the invention;

Fig. 5 is a plan view of the structure shown in section in Fig. 2 showing the upper edge of the shielding member 32 within the groove 31; and Fig. 6 shows a diamond shaped shielding member similar to that illustrated in section in Fig. 2 illustrating the bending of the strip to a desired shape.

Referring to the form of the invention shown in Fig. 1, 10 represents the annular side wall of a casing member adapted to receive electrical instrumentalities capable of emitting radio frequency discharges, the bottom of said casing being indicated by the numeral 11. The wall of the casing is of such thickness that the top thereof may be given transverse concave curvature as indicated at 12. A cover 13 is provided for the casing and is adapted to be held in place thereon by means of a screw 14 which engages an internally screw threaded boss 15 within the casing. Other means of attaching the cover to the casing may be employed if desired. The rim of the cover is provided with an annular flange 16 adapted to encircle the upper end of the wall 10 of the casing. The clearance between the flange 16 and wall 10 should be no more than is necessary, because closeness of fit tends to improve shielding. Inside the flange 16 the cover is provided with an annular ridge 17 having a sharp edge that is adapted to seat upon the concavely curved surface 12 of the wall 10. This sharp edge of the ridge may be forced into complete sealing contact with the metal of the casing. The screw 14 or other suitable means should be adapted to apply sufficient pressure to the ridge 17 to force it into complete and sealing contact with the wall of the body of the casing. The amount of pressure needed to accomplish this will vary according to the metals which compose the casing body and cover, but is never very great because the knife edge of the ridge makes line contact with the curved seat, the entire pressure is applied to that line, and very high specific pressure is produced because of the small area of the contact surface. Under some circumstances it may be thought advisable to make the cover of a harder metal than the body of the casing so that the edge of the ridge 17 may be embedded in the metal of the body portion of the casing without dulling the knife edge of the ridge. The curvature of the surface 12 materially assists in the seating of the cover and in the formation of a complete shield. Furthermore, concave curvature is preferred because the raised edges give protection to the curved seating surface, the level of which is below them.

In Fig. 4 is shown a modification of the embodiment of the invention disclosed in Fig. 1 in which the top of the side member 10 is made convex, as shown at 12'. In this modification it is advisable to furnish protection to the seating surface by means of flanges such as 16 on the cover and 18 on the body of the casing, particularly when the metal of the casing is relatively soft.

In Fig. 2 is shown a modification of the invention which for some purposes has elements of considerable superiority. Because of the nature of machine tools the form of the invention illustrated in Fig. 1 is largely confined to circular shapes. However, the principles embodied therein are highly advantageous and it is desirable that they should be extended to casings having shapes other than circular. Such a casing is shown in plan in Fig. 5, with the cover removed. The body member 30 of the said casing is provided at its upper edge with a groove 31. The formation of such a groove by machining may be said to offer certain difficulties, but no such difficulty is offered by other methods of formation such for instance as die casting or stamping. Within this groove is seated a shielding element 32 that is made of metal and has a polygonal shape in cross section, being shown in this instance as four-sided or diamond shaped. This element is of such dimensions that two of its angles or ridges are set snugly between the sides of the groove 31, its third ridge rests upon the bottom thereof, and its fourth pojects above the top of the groove and into contact with the cover 33. The metal of which the shielding member is made is preferably hard, capable of withstanding considerable pressures without substantial deformation, and capable of cold bending. Metals possessing these properties are known to metallurgists and include certain steels, wrought iron, nickel and some of its alloys, and certain alloys of copper. The combination in which the casing is of magnesium and the shielding element of tin-plated brass has been employed, and aluminum casings have been employed with a shielding element of aluminum wire. In general the metal of the sharp ridge may advantageously be at least as hard as the metal of which the cover 33 made, so that perfect contact and superior shielding may be affected, and may be hardened to such an extent, by methods known to the metallurgy of the metal used, that it is relatively immune to damage. When so hardened, the protective flanges may sometimes be omitted from the casing as shown in Fig. 2. A length of wire shielding may be cut off, the ends welded or brazed together and the loop bent to the required shape before insertion in the mounting groove, if desired.

The shielding element may be wire and formed on a typical wire making machine to any desired size, shape and length. The polygon may have as many sides as is desired, preferably being few so that the edges of the ridges may be sharp. As the number of sides on the polygon increases the angle of the side naturally becomes greater and as the shape approaches the circular certain advantages of the invention tend to disappear. Whereas a sharp angle in firm contact with a mating member will serve not only to contain radio emanations but will prevent the ingress or egress of liquids or gases, the circular shape is less capable of giving complete line contact and tends to some extent to act as a capillary, giving inferior protection as well as less effective shielding. Giving a round element of this sort of a soft interior reduces it to the character of a mere gasket, the use of which is known to be imperfect and an admission of an imperfect joint.

In Fig. 3 is shown a modification of the form of invention disclosed in Fig. 2 in which the cover is provided with a depending flange 34 similar to that described hereinabove and tending to differ therefrom only in having internal ring 35 adapted to make contact with the wall of the body portion of the casing.

Where it is necessary or desirable to use unlike metals for the cover and the body member of the form of the invention shown in Fig. 1, or for the casing and the shielding member in the form of the invention shown in Fig. 2, it is advisable to choose metal combinations that do not produce destructive galvanic action. In this connection it is known that combinations such as silver and platinum, copper and Monel, cadmium and steel are quite compatible. The selection of proper and compatible combinations reduces galvanic corrosion and decreases the number of shielding failures in the field.

An advantage of this invention is that continuous line contact is obtained between the parts of a joint whereas with previous constructions, continuous line contact either was not recognized to be desirable or failed to be provided by the construction involved.

The casing and joint construction set forth herein is an effective shield against ignition and other electrical interference over the entire range of frequency used in aircraft radio communication, whereas previous constructions gave imperfect shielding to the entire range of radio emanations or eliminated interference by only a portion of the range.

Shielding is a science, the importance of which was not hereinbefore fully recognized, and the principles of which have not been heretofore fully developed. This invention is believed to represent a substantial advance in this science.

Only a few embodiments of the present invention are herein illustrated and described, and it is to be expressly understood that the same is not limited thereto. Various changes may be made therein, particularly in the design and arrangement of the parts illustrated without departing from the spirit and scope of the invention, as will now be apparent to those skilled in the art.

What is claimed is:

A casing impermeable to radio waves comprising a body member, a cover member, and an endless ridge of hard metal integral with one of said members and having converging inner and outer surfaces terminating in a relatively sharp edge in line contact with the other of said members, along a surface curved in planes perpendicular to the plane containing said edge, a flange on one said member overlapping the joint between said members and circumscribing the said joint at a distance from said line of contact, and means for imparting linear movement to said cover to press said sharp edge against said other member.

MILLER S. TYSON.

REFERENCES CITED

The following references are of record in the file of this patent:

UNITED STATES PATENTS

| Number | Name | Date |
|---|---|---|
| 128,664 | Saunders | July 2, 1872 |
| 332,793 | Dickson | Dec. 22, 1885 |
| 416,234 | Perot | Dec. 3, 1889 |
| 560,452 | Westinghouse | May 19, 1896 |
| 613,053 | Bates | Oct. 25, 1898 |
| 757,376 | Whitaker | Apr. 12, 1904 |
| 898,858 | Feldman et al. | Sept. 15, 1908 |
| 1,522,999 | Campbell | Jan. 13, 1925 |
| 1,583,126 | Crane | May 4, 1926 |
| 1,630,510 | Ames | May 31, 1927 |
| 1,634,655 | Elstone | July 5, 1927 |
| 1,765,443 | Peterson | June 24, 1930 |
| 1,834,581 | Ferrell et al. | Dec. 1, 1931 |
| 2,317,813 | Schoenborn | Apr. 27, 1943 |

FOREIGN PATENTS

| Number | Country | Date |
|---|---|---|
| 166,367 | Great Britain | July 21, 1921 |
| 264,930 | Great Britain | Jan. 31, 1927 |